United States Patent [19]

Hansen

[11] Patent Number: 4,915,486

[45] Date of Patent: Apr. 10, 1990

[54] DISPLAY PANEL FOR IMAGE PRESENTATION AND/OR RECORDING

[75] Inventor: Kjell Hansen, Sætre, Norway

[73] Assignee: Powercraft AS, Nesbru, Norway

[21] Appl. No.: 130,457

[22] PCT Filed: Mar. 10, 1987

[86] PCT No.: PCT/NO87/00018

§ 371 Date: Nov. 23, 1987

§ 102(e) Date: Nov. 23, 1987

[87] PCT Pub. No.: WO87/06046

PCT Pub. Date: Oct. 8, 1987

[30] Foreign Application Priority Data

Mar. 25, 1986 [NO] Norway .................................. 861187

[51] Int. Cl.[4] .......................... G02B 27/14; G02F 1/13
[52] U.S. Cl. .................................... 350/171; 350/330; 350/96.15; 340/784
[58] Field of Search ............... 350/345, 347 V, 347 E, 350/171, 96.1, 96.15; 340/796, 784; 362/244, 245, 97, 26, 27, 19

[56] References Cited

U.S. PATENT DOCUMENTS

| | | | |
|---|---|---|---|
| 3,491,245 | 1/1970 | Hardesty | 362/26 X |
| 3,700,802 | 10/1972 | Markin et al. | 358/230 |
| 3,838,908 | 10/1974 | Channin | 350/334 |
| 4,113,353 | 9/1978 | Matsushita | 350/96.15 |
| 4,167,307 | 9/1979 | Cirkler et al. | 350/345 |
| 4,280,125 | 7/1981 | Kazan | 340/795 |
| 4,330,813 | 5/1982 | Deutsch | 350/345 |
| 4,653,862 | 3/1987 | Morozumi | 350/339 F |

FOREIGN PATENT DOCUMENTS

| | | | |
|---|---|---|---|
| 2552278 | 5/1977 | Fed. Rep. of Germany . | |
| 2647991 | 12/1977 | Fed. Rep. of Germany . | |
| 3018099 | 11/1981 | Fed. Rep. of Germany . | |
| 3148421 | 7/1983 | Fed. Rep. of Germany | 340/784 |
| 3313288 | 10/1984 | Fed. Rep. of Germany | 340/784 |
| 2517446 | 11/1981 | France . | |
| 2526981 | 5/1982 | France . | |
| 8303013 | 9/1983 | PCT Int'l Appl. | 350/345 |
| 8404601 | 11/1984 | PCT Int'l Appl. . | |
| 8404641 | 11/1984 | PCT Int'l Appl. . | |

*Primary Examiner*—Stanley D. Miller
*Assistant Examiner*—Napoleon Thantu
*Attorney, Agent, or Firm*—Fleit, Jacobson, Cohn, Price, Holman & Stern

[57] ABSTRACT

Display panel for image presentation and/or recording, comprising a matrix formed of a horizontal (1A-D) and a vertical (33A-E) element set respectively, adapted to be addressed for selecting points that shall present, alternatively pick up light, one of these element sets acting as shutter means (33A-E) for light. The other element set consists of optical light conductors (1A-D) adapted to receive (39A-D), alternatively to emit (40A-D) light at their ends located outside the matrix itself. The light conductors, which can be in the form of optical fibres, are provided with means (2A-D) positioned at said points for diverting light out of, alternatively into the light conductors (1A-D) transverse to their longitudinal direction. This transverse light directly forms the image presented, alternatively directly represents the image recorded, by addressing of both element sets (1A-D, 33A-E). This form of display panel has various practical applications, for example in television sets, data terminals, in particular two-way television and two-way data terminals, which can both present an image and perform recording of a picture or scene.

12 Claims, 4 Drawing Sheets

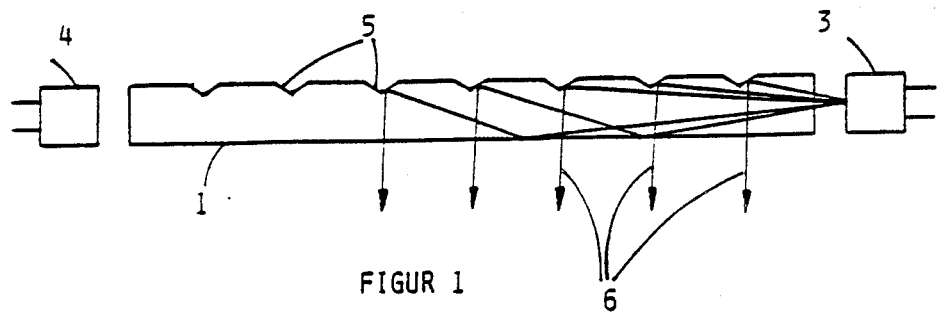
FIGUR 1
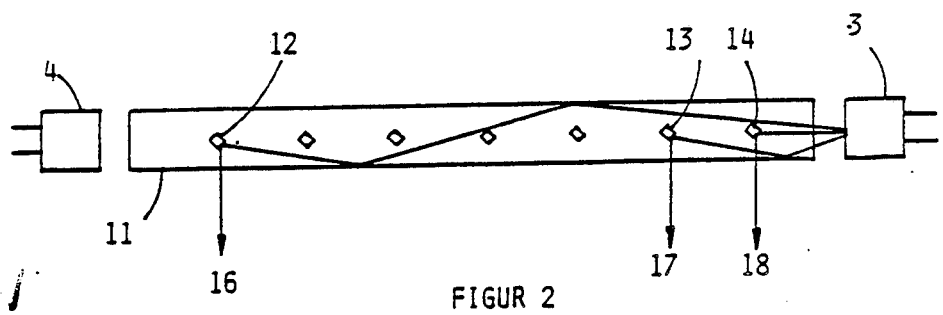
FIGUR 2
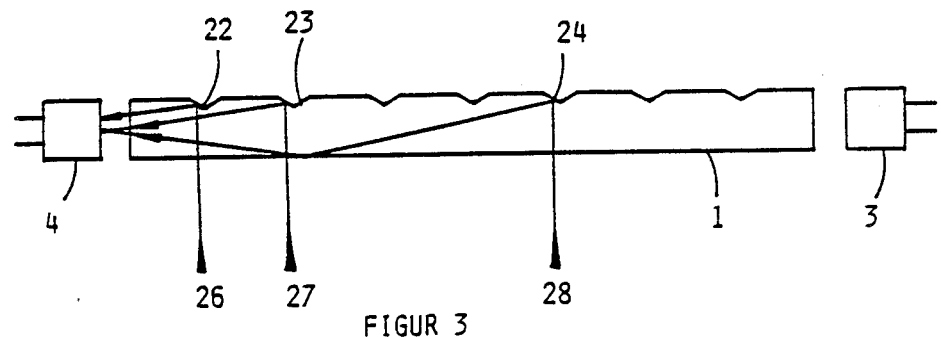
FIGUR 3
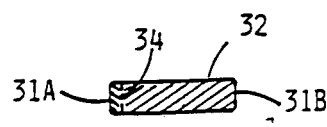
FIGUR 4

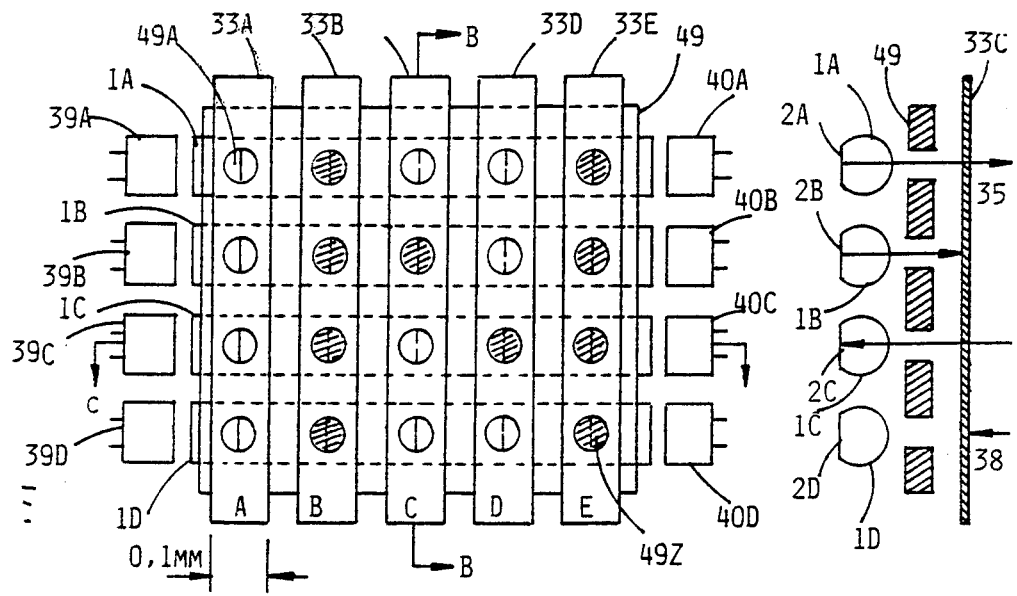
FIGUR 6A
FIGUR 6B
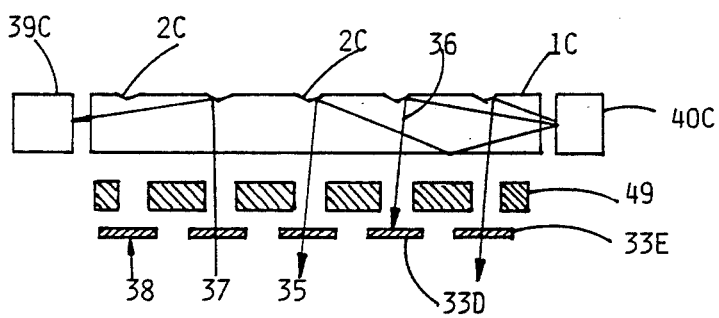
FIGUR 6C
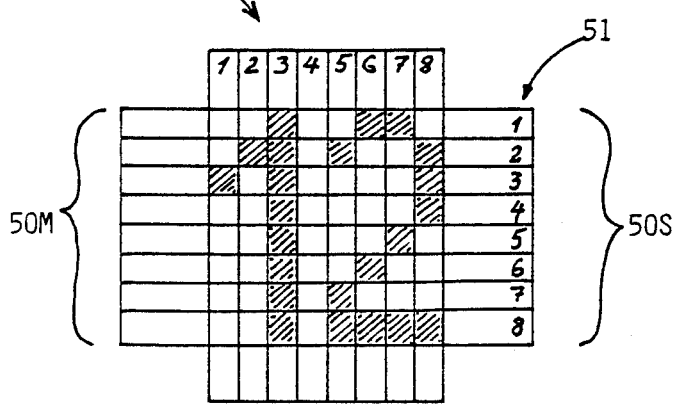
FIGUR 7

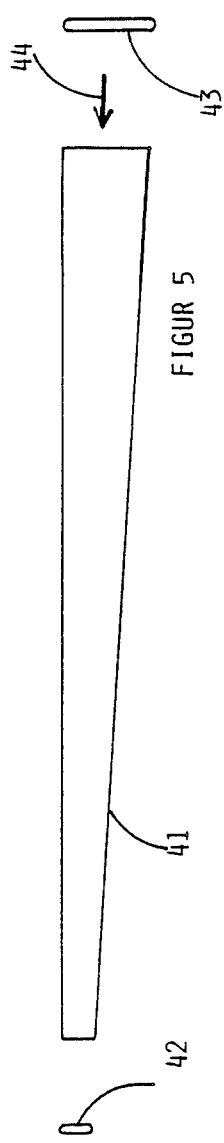
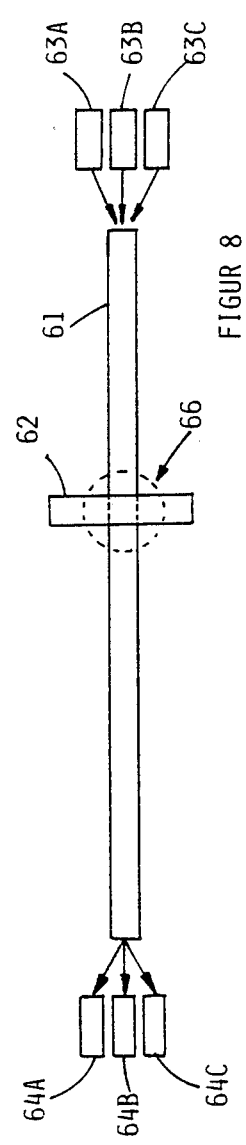
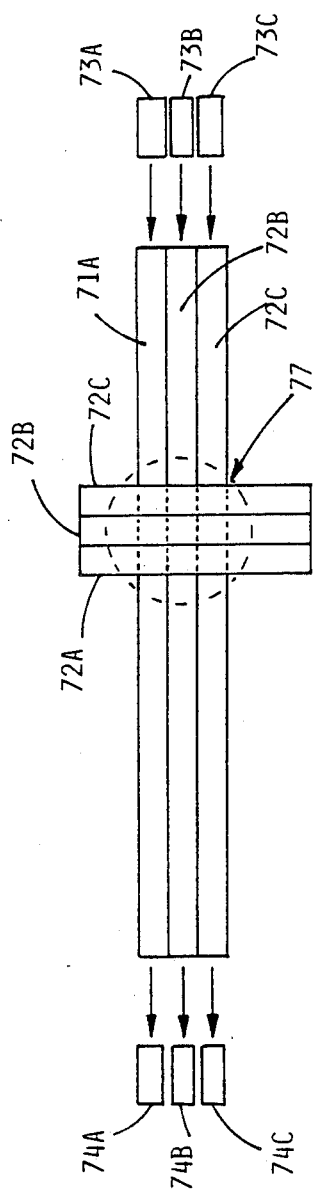

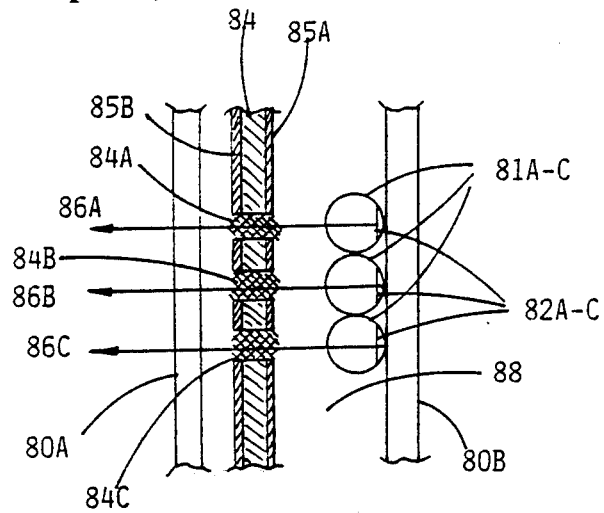
FIGUR 10
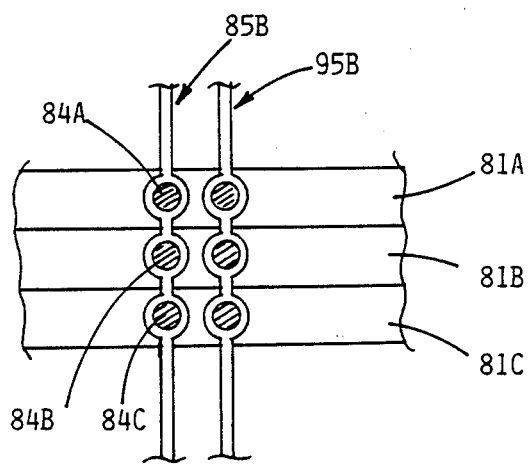
FIGUR 11

DISPLAY PANEL FOR IMAGE PRESENTATION AND/OR RECORDING

This invention relates to a display panel for image presentation (display) and/or recording, comprising a matrix formed of a horizontal and a vertical element set, respectively, adapted to be addressed for selecting points that shall present, alternatively pick up light, one of the element sets acting as shutter means for light.

Displays for image presentation are today incorporated in various products, for example television sets, osiclloscopes, data terminals, medical and other instruments, instrument panels in cars, airplanes and other vehicles, as well as video monitors. As will appear from the following description the invention relates to a display panel which can be used both for presenting and for recording images. This makes possible new practical applications beyond those mentioned above, for example two-way data terminals which can both display a picture and pick up a picture, such as drawings or the like, two-way television and so forth.

Various known techniques have been employed for image presentation, and the most common are based on cathode ray tubes, liquid crystals (LCD), gas plasma techniques, vacuum fluorescent elements and light emitting diodes.

This invention is based upon main components being in the principle previously known per se, i.e. light conductors such as optical fibers and shutter means, for example based on liquid crystals. The prior art which also in part use such components may be considered to be represented by U.S. Pat. No. 3,700,802 and U.S. Pat. No. 3,838,908. The former U.S. patent describes optical fibers from which light can be diverted for acting on light sensitive elements which in turn activate liquid crsytal cells. These then emit light for image forming. Also the latter U.S. patent above is directed to the forming of images by addressing points in a matrix in which there are incorporated light conductors ("wave guides") which include liquid crystals. However, in these cases rather complicated and expensive structures are described, which it is difficult to implement in practice. In part there may also be doubt that the effect aimed at is attainable in practice at all.

The more well-known and traditional forms of image displays otherwise have a number of drawbacks and deficiencies. The cathode ray tube, inter alia, involves a heavy weight, a large space requirement, a high operational voltage and a large power consumption. LCD picture panels are slow in operation, delicate and difficult to read under many circumstances. Gas plasma displays are relatively expensive and need high voltages as well as a limited imaging sharpness. Corresponding drawbacks are also found in vacuum fluorescent elements. Display panels based upon light emitting diodes have not been manufactured to any large scale and probably will not be so because of difficulties of electronic nature and with respect to power.

None of the display panel techniques hitherto known makes it possible by means of one and the same unit both to present pictures and to pick up images on the same display panel.

In view of what is previously known, the novel and specific features in a display panel as stated in the above introduction, according to the invention primarily consists therein that said other element set consists of optical light conductors adapted to receive, alternatively emit light at their ends located outside the matrix itself, and is provided with means positioned at said points for diverting light out of, alternatively into the light conductors transverse to their longitudinal direction, and that this transverse light directly forms the image presented, alternatively directly represents the image recorded, by addressing of both element sets.

The fundamental solution according to the inventionas stated here, involves a number of advantages compared to the various known and proposed systems, inter alia a faster operation, a simpler and more robust design, a good light intensity and above all the ability to both present and record images in combination.

Different embodiments of dislay panels according to the invention as well as additional specific features thereof, shall be explained more closely in the following description with reference to the drawings, in which:

FIG. 1 schematically shows a light conductor with one form of light diverting means, FIG. 2 shows a light conductor with a second form of light diverting means, FIG. 3 shows the light conductor of FIG. 1 used for image recording, FIG. 4 shows a light conductor having a rectangular cross-section, FIG. 5 shows a light conductor having a varying cross-section along its length, FIG. 6A schematically and simplified shows a matrix consisting of a vertical and a horizontal element set respectively, with associated components, as an example of a display panel embodiment according to the invention, FIG. 6B shows a cross-section according to line B—B in FIG. 6A, FIG. 6C shows a cross-section according to line C—C in FIG. 6A, FIG. 7 schematically shows a matrix for presenting two-digit numerals, FIG. 8 shows a horizontal and a vertical individual element respectively, for forming a single image point with colour presentation or representation, FIG. 9 shows another form of colour presentation-representation at a single picture point, FIG. 10 shows in enlarged cross-section a particular embodiment of the display panel according to the invention, and FIG. 11 shows a portion of the display panel in FIG. 10 seen from the front side.

The main principle on which the invention is founded, is shown in FIG. 1. Highly schematically there is drawn therein a light conductor or optical fibre 1 at one end of which there is provided a light emitter 3, whereas a light receiver 4 is placed at the other end of light conductor 1. The light conductor 1 is provided with means 5 serving to divert light transversally with respect to the longitudinal direction of the light conductor. Thus, in FIG. 1 there are shown a number of light rays emitted through the end of the light conductor from light emitter 3 and during their propagation through the light conductor these light rays will hit these means 5 and will be diverted transversally as indicated at 6 in the figure. These diverting means 5 may be in the form of small incisions or notches in the surface of light conductor 1, preferably extending transversely through the longitudinal direction thereof. Thereby small reflecting surfaces will be formed, which cause the diversion of light transversally of the light conductor and out of this. It will be realized that the angle of the reflecting surfaces formed by the notches 5, must be adjusted so as to obtain a desired direction of the diverted light rays 6, usually as much as possible normal to the longitudinal direction of the light conductor.

The principle illustrated in FIG. 1 comprises diverting means in the form of depressions, for example incisions or notches formed in the surface of the light conductor 1, but diverting means can also be provided in other ways.

FIG. 2 shows a particular form of light conductor 11 in the interior of which there are embedded crystals, for example crystals 12, 13 and 14, having reflecting surfaces having a corresponding effect as the notches 5 in FIG. 1. Light being sent from light emitter 3 through the end of light conductor 11 thereby will be diverted transversally out of the light conductor as indicated at 16, 17 and 18 in FIG. 2.

FIGS. 1 and 2 show light conductors with diverting means used for emitting light transversally to the light conductors, i.e. for presenting an image to the user or observer. FIG. 3 shows the recording of an image or scene by means of an arrangement being in the principle as in FIG. 1. Incident light rays 26, 27 and 28 transversally to the light conductor 1 in FIG. 3, will fall upon diverting means as shown at 22, 23 and 24 and by the reflecting surfaces thereof are directed in the longitudinal direction of light conductor 1 towards the left in the figure, so that the incident light in the various points along the light conductor, will be guided together towards the light receiver 4 for detection or recording. With a suitable control and signal processing as shall be explained more closely below, it is thereby possible to record signals which represent the picture or scene which is applied to an arrangement of such light conductors.

The above incisions or notches in the optical fibres which constitute the light conductors, can for example quite simply be formed by a suitable knife being moved across the fibre with a sufficiently fine control or adjustment. Possibly this cutting can take place mechanically. By displacing the fiber in its longitudinal direction at suitable steps, the notches will be formed at a desired correct spacing, depending upon the density of picture points for the image presentation or alternatively recording. Another way of producing the notches is by means of heat, i.e. smelting-in the notches or depressions. Also grinding can be employed for producing the notches.

The form of light conductors or optical fibers taken as a basis in FIG. 2, can be manufactured thereby that in the molten mass from which the fibres are produced by extrusion, there are mixed-in reflecting elements, in particular crystals, which form the reflecting surfaces. In order to give such crystals a correct orientation during manufacture, there can be applied a powerful magnetic field. The crystals may consist of iron compounds or other chemical compounds having magnetical properties.

The light emitter 3 in FIGS. 1, 2 and 3 can be a light emitting diode or possibly several such diodes if it is desired to present colour pictures. On the other hand light receiver 4 can be a light sensitive diode, possibly several diodes if colour recording shall take place.

A number of light conductors or optical fibers with diverting means as discussed above, must be arranged in a matrix in order to form the display surface of a panel or the like, alternatively the recording surface in the case of picking-up or receiving an image which represents a scene.

Whereas optical fibres usually have a round cross-section, which is completely useful in connection with this invention, it has been found that particular designs of the light conductor or fiber can be advantageous. Thus, FIG. 4 shows an enlarged cross-section of a light conductor having a rectangular cross-sectional shape. The cross-section of FIG. 4 is relatively flattened, having long side edges 32 and two short side edges 31A and 31B. In order to avoid leakage of light outwardly at the corners of the cross-section, these may possibly be somewhat rounded. In the surface of the light conductor at the edge 31A there are indicated incisions or notches 34 corresponding for example to notches 5 in FIG. 1. With such a light conductor it will be comparatively simple and inexpensive to assemble a number of light conductors by simply putting these on top of each other with interengaging side faces 32 and the short side 31A with notches 34 facing in the same direction. It will not only be expedient in practice to stack such light conductors on each other in order to form a complete matrix, but the very manufacturing of the individual fibers will also be rationalized, since these light conductors can be cut or stamped out of a larger sheet formed stock.

FIG. 5 also shows a light conductor 41 having a rather flattened cross-section, but besides this light conductor has a diminishing cross-section from one end towards the other. To the left at 42 it is shown that light conductor 41 has a substantially rectangular, but much rounded cross-section, corresponding to the cross-section 43 at the opposite end. The thickness is the same whereas the length dimension of the cross-section is larger at the right-hand end 42 than at the left-hand end 42 in FIG. 3. There are not shown any diverting means in the form of for example depressions, such as incisions or notches in light conductor 41, but such means may have a similar form as shown in FIG. 1 and FIG. 2. When light comes in as shown at 44, the diversion of light gradually along the longitudinal direction of light conductor 41 towards the left, will imply that the magnitude of the light flux all the way along light conductor 41 will be the same, because of the diminishing cross-section. This in turn will result in equal lights intensity at all diversion or image points along the light conductor.

FIGS. 6A, 6B and 6C show much simplified and at an enlarged scale a matrix or display panel for image presentation and/or recording, to illustrate essential features of this invention. The matrix comprises a set of elements extending horizontally and consisting of optical light conductors or fibres 1A, 1B, 1C and 1D. A set of vertically extending elements constitutes shutter means 33A, 33B, 33C, 33D and 33E, which preferably can be segments containing liquid crystals. By suitable application of electrical fields as known per se, the liquid crystals may be brought into a light absorbing condition, i.e. they can serve as shutter means.

Image points are formed at the intersections between the two element sets, an image point 49A being indicated at the top left and another image point 49Z at the bottom right of FIG. 6A. In this figure it is also indicated that the width of a shutter element (element 33A) can be for example 0.1 mm. This dimension suggests the density of image points in such a matrix.

Light conductors 1A–D are shown in cross-section in FIG. 6B, from which it appears that the light conductor cross-section is essentially circular, but it has incisions or notches 2A–2D in order to effect the previously discussed transverse diverting of light. FIG. 6C shows more particularly a cross-section through light conductor 1C in FIG. 6A and notches 2C along this.

At the right of FIG. 6A there are shown light emitters 40A–40D for the respective light conductors 1A–1D, whereas at the opposite ends of these light conductors there are provided associated light receivers 39A, 39B, 39C and 39D.

An additional important part of the matrix in FIGS. 6A–C is a perforated plate 49 (see FIGS. 6A and 6B) which has an aperture for each image point. As shown specifically in FIG. 6C there is a shutter element or segment 33A–E lying in front of each vertical row of image points or apertures in plate 49. Possibly plate 49 can constitute a back plate or an electrode for applying voltage across the liquid crystals in shutter segments 33A–E.

FIGS. 6B and 6C illustrate the following examples of ray-paths in the arrangement: For presentation of an image it is shown in FIG. 6C that light emitter 40C emits light rays into fibre 1C, in which a light beam 35 is reflected from one of the notches 2C and passes out through an aperture in plate 49 and further on through the shutter element in front of this, the shutter element being considered open for light passage. In contrast the beam 36 diverted sideways from fiber 1C through a corresponding aperture in plate 49, will impinge on a blocked shutter segment 33D so that this image point will be dark. The adjacent element 33E, however, has not been activated so that a light beam can pass through this element and thereby will be visible outwards.

In the inverted operation of the matrix, i.e. for picture recording or reception from the outside, the light rays will come in as shown for example with beams 37 and 38. Light beam 37 from the outside will pass through an open shutter and will be diverted by a diverting element in light conductor 1C towards the left in FIG. 6C and thereby will be led to light receiver 39C. Light beam 38, however, is considered to impinge on a blocked shutter and therefore will not be detected at the time represented by the situation in FIG. 6C.

In the following closer description of the operation of an arrangement as shown in FIGS. 6A–C it is thought that picture information is stored by means of more or less conventional electronic circuits on a digital basis, usually by means of semiconductor memories, with control of the matrix at a certain rate with pulsating time intervals. Quite correspondingly such successive time intervals can be employed during recording ("photographing") of an image or scene. Since the required digital electronics for storing, control and so forth mainly is based upon conventional technology, the electronics shall not be described in detail here.

In order to form (emit-send) an image, light is emitted from light emitter 40A into the optical light conductor 1A during a first time interval. Shutter segments 33A, 33C and 33D are shown activated in FIG. 6A so that they block for light passage. Light will then be sent out through segments 33B and 33E as indicated with hatching of the corresponding image points (intersections) in FIG. 6A. In the next time interval light is applied to light conductor 1B from emitter 40B and the shutter segments are activated in a different manner from what was done in the first time interval, namely now with segments 33B, 33C and 33E open for the passage of light. During this time interval segments 33A and 33D are blocked.

In this manner the application of light proceeds sequentially to all light conductors or optical fibers in the matrix, with corresponding control of shutter means 33A–33E for generating the desired image or picture.

When recording a picture from the outside, the operation will be so to speak inverted, all light receivers 39A–D being active during all time intervals, whereas one of the shutters 33A–E is opened in each time interval in order to allow the passage of light. Information about the picture or scene of which a recording shall be made, thus can be acquired by measuring the intensity of the incident light in the image points, by means of the light receivers 39A–D. In this operational mode the apertures in plate 49 will provide for focusing or rather a separation of the various incident light beams.

It is obvious that the panel or matrix in FIG. 6A which has a total number of 20 addressable image elements or points, is strongly simplified compared to a display panel for practical use, in which there will be incorporated a much higher number of addressable image points. This is made possible not only in view of the particular features according to the invention, but also by straightforward use of available exterior components and digital electronics as well-known to experts.

FIG. 7 serves to illustrate somewhat more in detail the operation of a display panel according to the invention. What is considered here is recording ("photographing") of a pattern in the form of numeral "12" on a matrix actually intended for example for two-digit numerals. In FIG. 7. there is included a set of shutters 52 at a number of 8 and a set of light conductors 51 also being present at a number of 8. The right-hand side of the figure can be regarded as the sending side 50S whereas the left-hand side is the receiving side 50M.

By addressing the matrix during image recording the shutters 52 are each opened in a separate time interval at the same time an incident and diverted light is recorded at the receiving side 50M in all 8 fibres 51 (left-hand end) in the same time interval.

For recording the numeral "12" as indicated in in FIG. 7, the following sequence of time intervals and operations thus will be performed in the two sets of elements:

|  | Shutter open | Light received in Fibre number | | | | | | | |
| --- | --- | --- | --- | --- | --- | --- | --- | --- | --- |
|  |  | 1 | 2 | 3 | 4 | 5 | 6 | 7 | 8 |
| Time interval 1 | 1 | 1 | 0 | 1 | 1 | 1 | 1 | 1 | 1 |
| 2 | 2 | 1 | 0 | 1 | 1 | 1 | 1 | 1 | 1 |
| 3 | 3 | 0 | 0 | 0 | 0 | 0 | 0 | 0 | 0 |
| 4 | 4 | 1 | 1 | 1 | 1 | 1 | 1 | 1 | 1 |
| 5 | 5 | 1 | 0 | 1 | 1 | 1 | 1 | 0 | 0 |
| 6 | 6 | 0 | 1 | 1 | 1 | 1 | 0 | 1 | 0 |
| 7 | 7 | 0 | 1 | 1 | 1 | 0 | 1 | 1 | 0 |
| 8 | 8 | 1 | 0 | 0 | 0 | 1 | 1 | 1 | 0 |

In the above table (logical) "1" means light recorded at the receiving side, whereas (logical) "0" means absence of light. Thus, the represented numeral "12" will be provided as a pattern of logical "0" because numeral "12" has been considered to be written in black on a white background.

For colour reproduction the display panel according to the invention in the usual manner can be based upon three colour components, such as red, yellow and blue. FIG. 8 shows a single intersection between an optical fiber 61 and a shutter element 62 so as to form an image point represented by indication 66 in FIG. 8. At the sending side to the right in the figure there are shown three light sources 63A, 63B and 63C for red, yellow and blue light, respectively. Correspondingly at the receiving side there are shown light receivers 64A, 64B and 64C for the colours red, yellow and blue. The operation for colour reproduction with single fibers being common to the three colour components, is based on sub-time intervals for each colour component, and the shutter 62 must also then be controlled at the same rate, i.e. with sub-time intervals for each colour, so that correct reproduction during emission (presentation) of the image, respectively during recording (representation) of a scene can take place in appropriate manner with respect to the colours involved.

An alternative arrangement is shown in FIG. 9 in which for each of the three colour components there is provided a fiber group consisting of three individual fibres 71A, 71B and 71C. Associated light emitters are designated 73A, 73B and 73C respectively, whereas corresponding light receivers are 74A, 74B and 74C, respectively. With such a sub-division of the fiber at each intersection point 77 it is also necessary to have a divided shutter element, i.e. with parts 72A, 72B and 72C, respectively. Shutter part 72A can for example operate for red light, shutter part 72B for yellow light and shutter part 72C for blue light. Accordingly, the three light components may be simultaneously emitted into fibres 71A, 71B and 71C, since the shutter parts effect control of which light colours and which light intensity shall be emitted. The operation for receiving will be quite analog, for recording the light colour components in the receivers 74A–C.

As an example of an advantageous practical design, FIG. 10 shows an enlarged cross-section through a display panel structure in which the shutter means are integrated with the apertures in the plate or mask involved in the structure. The structure of FIG. 10 comprises a front glass plate 80A and a back plate 80B being preferably black, at least interiorly. Adjacent back plate 80B there are shown three optical fibres 81A–C having notches 82A–C. From these three fibers there are shown diverted or outgoing light beams 86A, 86B and 86C respectively, which penetrate outwardly through glass plate 80A. Moreover, the structure comprises a plate shaped mask 84, for example of ceramic material having holes or apertures 84A, 84B and 84C respectively, coincident with the respective fibres 81A–C. The indicated light beams each are emitted through a separate one of these apertures 84A–C.

Between the plates 80A and 80B there is a filling of liquid crystals (LCD liquid) which also fills the apertures 84A–C in the mask plate 84. One surface of this plate is provided with an anode 85A and at the opposite surface with a cathode 85B in a pattern which makes it possible to activate the liquid crystals in the apertures 84A–C.

FIG. 11 shows the arrangement of FIG. 10 seen from the front side, this FIG. 11 in addition to said cathode 85B also showing another adjacent cathode 95B. As will be seen from this figure, cathode 85B extends as an annulus around the respective apertures 84A–84C in order to obtain the intended activation of the LCD liquid therein. As a practical measure the anode coating 85A at the back of mask plate 84 can cover the whole area thereof. The anode is connected to a voltage all the time, whereas the cathode row, for example 85B and 95B respectively, are selectively energized for activation of the LCD liquid with a desired pattern of apertures in the mask plate 84, so that light diverted from the fibres is blocked, and let through the mask, respectively. This involves a very advantageous integration of the shutter means with the mask and the apertures therein.

Although not specifically mentioned in the above description it goes without saying that the display panel according to the invention can be adapted for operation with live images ("motion pictures").

Literature References

1. OPTICAL FIBER COMMUNICATIONS of Gerd Keiser, McGraw-Hill, U.S.A.
2. OPTOELECTRONICS DESIGNER'S CATALOG 1985, Hewlett Packard.
3. The article "MULTIPLEXED LIQUID CRYSTAL MATRIX DISPLAYS" of J. Duchene, Displays, January 1986.

I claim:
1. Display panel for image presentation and recording, comprising:
   a number of optical light guide means for propagating first light there through along a longitudinal axis between two ends of the number of optical light guide means, with said first light to be presented as an image, and for propagating second light there through along said longitudinal axis between said two ends thereof, with said second light representing an image received and to be recorded;
   light emitter means provided at one end of said number of optical light guide means for providing said first light to that end of said number of optical light guide means representing the image to be presented;
   light receiver means provided at the other end of said number of optical light guide means for receiving said second light representing the image received;
   light diverting means for diverting said first light transversely with respect to the longitudinal axis of said number of optical light guide means from said light emitter means and for diverting said second light received from a direction transverse to said longitudinal axis, along the longitudinal axis of said number of optical light guide means to said light receiver means;
   said light diverting means including fixed elements being integral with said optical light guide means; and
   a number of shutter means intersecting said number of optical light guide means at locations of said light diverting means, thus forming a matrix, and said optical light guide means have their ends located outside the matrix, and said intersecting locations constituting addressable points in the display panel.

2. Display panel according to claim 1, wherein said optical light guide means is adapted to receive and alternatively emit light at their ends located outside the matrix.

3. Display panel according to claim 2, wherein in front of said number of optical light guide means in the matrix is provided a mask with an aperture for each of said addressable points.

4. Display panel according to claim 3, wherein said number of shutter means are integrated into said mask in association with the apertures therein.

5. Display panel according to claim 4, wherein said number of shutter means when receiving light are adapted to be opened in sequence in separate time intervals, with simultaneous separate recording to received light in said number of optical light guide means in each time intervals.

6. Display panel according to claim 1, wherein said light diverting means is adapted to include depressions formed in said number of optical light guide means.

7. Display panel according to claim 1, wherein said light diverting means is adapted to include small incisions or notches in said number of optical light guide means.

8. Display panel according to claim 1, wherein said light diverting means is adapted to include reflecting elements provided within said number of optical light guide means.

9. Display panel according to claim 8, wherein said reflecting elements are a plurality of crystals provided in said number of optical light guide means.

10. Display panel for image presentation and recording, comprising:

optical light guide means including a number of optical fibers for propagating first light there through along a longitudinal axis between two ends of said optical light guide means, with said first light to be presented as an image, and for propagating second light there through along said longitudinal axis between the two ends of said optical light guide means, with said second light representing an image received and to be recorded;

light emitter means provided at one end of said optical light guide means for providing said first light to that end of said optical light guide means representing the image to be presented;

light receiver means provided at the other end of said optical light guide means for receiving said second light representing the image received; and light diverting means for diverting said first light transversely with respect to the longitudinal axis of said optical light guide means from said light emitter means and for diverting said second light received from a direction transverse to said longitudinal axis, along the longitudinal axis of said optical light guide means to said light receiver means.

11. Display panel according to claim 10, further comprising a number of shutter means intersecting said optical light guide means at locations of said light diverting means, thus forming a matrix, and said optical light guide means have their ends located outside the matrix, and with said intersecting locations constituting addressable points in the display panel.

12. Display panel according to claim 11, wherein said light diverting means includes fixed elements being integral with said optical light guide means.

* * * * *